(12) United States Patent
Deckert et al.

(10) Patent No.: US 9,090,009 B2
(45) Date of Patent: Jul. 28, 2015

(54) METHOD AND APPARATUS FOR IN-MOLD DECORATION

(75) Inventors: Klaus Deckert, Postbauer-Heng (DE); Thomas Komenda, Fürth (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 465 days.

(21) Appl. No.: 13/472,694

(22) Filed: May 16, 2012

(65) Prior Publication Data

US 2012/0292817 A1 Nov. 22, 2012

(30) Foreign Application Priority Data

May 20, 2011 (DE) .......................... 10 2011 102 722

(51) Int. Cl.
*B29C 45/14* (2006.01)
(52) U.S. Cl.
CPC ..... *B29C 45/14688* (2013.01); *B29C 45/14811* (2013.01); *B29C 45/14016* (2013.01); *B29C 45/1418* (2013.01); *B29C 2045/14106* (2013.01); *B29C 2045/14147* (2013.01); *B29C 2045/14155* (2013.01); *B29C 2045/14918* (2013.01)

(58) Field of Classification Search
USPC .......................................... 264/275; 425/112
See application file for complete search history.

(56) References Cited

U.S. PATENT DOCUMENTS

| | | | | |
|---|---|---|---|---|
| 3,156,847 A | * | 11/1964 | Schweriner | 361/230 |
| 4,470,784 A | * | 9/1984 | Piotrovsky | 425/116 |
| 6,117,384 A | * | 9/2000 | Laurin et al. | 264/297.2 |
| 6,416,706 B1 | * | 7/2002 | Fisher et al. | 264/484 |
| 6,623,677 B1 | * | 9/2003 | Smith et al. | 264/132 |
| 6,652,983 B1 | * | 11/2003 | Mori | 428/480 |

FOREIGN PATENT DOCUMENTS

| | | |
|---|---|---|
| DE | 10020993 | 10/2001 |
| DE | 102007034751 | 10/2008 |

\* cited by examiner

*Primary Examiner* — Joseph S Del Sole
*Assistant Examiner* — John Robitaille
(74) *Attorney, Agent, or Firm* — Hoffmann & Baron, LLP

(57) ABSTRACT

A method and an apparatus for manufacturing a shaped part (14) decorated by in-mold decoration (IMD) and in-mold labelling (IML) with an injection molding apparatus (1) having a decoration-side tool half (12) and a core-side tool half (11), wherein the decoration-side tool half (12) is movable and the core-side tool half (11) is fixed with respect to a frame structure. An IMD film (16) is introduced into the decoration-side tool half (12) and an IML shaped part is introduced into the core-side tool half (11).

19 Claims, 3 Drawing Sheets

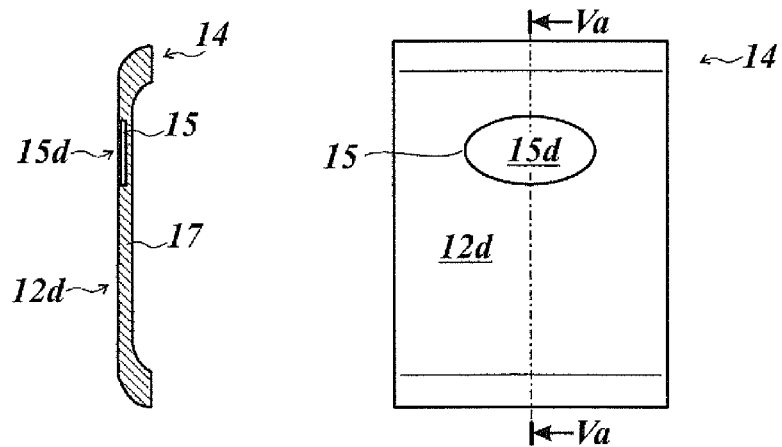
*Fig. 5a*  *Fig. 5b*
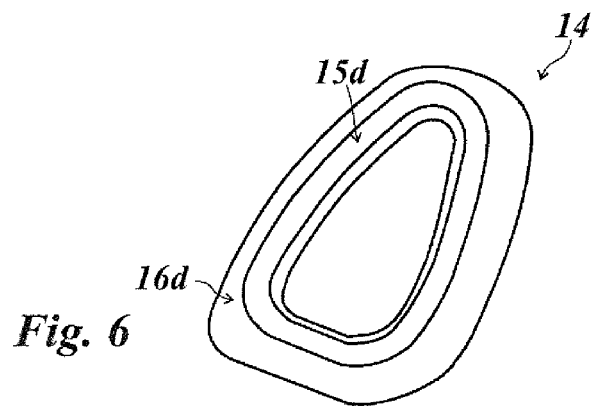
*Fig. 6*
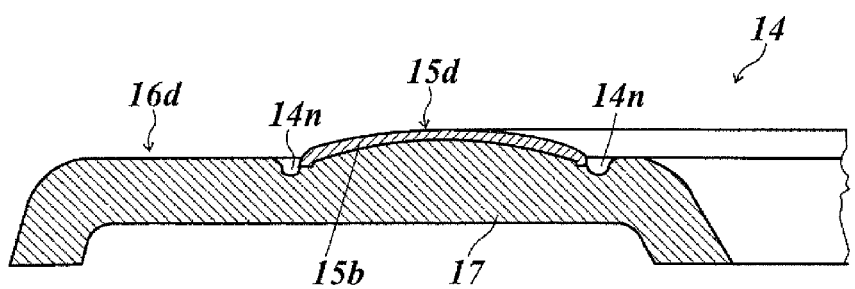
*Fig. 7*

METHOD AND APPARATUS FOR IN-MOLD DECORATION

BACKGROUND OF THE INVENTION

The invention concerns a method of and an apparatus for in-mold decoration.

It is known for plastic injection moldings produced by injection molding to be decorated with a decorative layer in the injection molding process, wherein a so-called in-mold decoration film (IMD=in-mold decoration) is fitted into the injection molding tool and the decorative layer of the IMD film is transferred on to the surface of the injection molding over the full surface area. The IMD film is of a similar structure to a hot embossing film, wherein the decorative layer is arranged on a carrier film releasably, in particular by means of a release layer, and the decorative layer further has a heat-activatable adhesive layer portion. It is also known for so-called in-mold labelling or insert molding shaped parts to be inserted into injection molding molds. The IML shaped part (IML=in-mold labelling) is a decorated insert shaped part in which an insert part decorative layer is applied to a so-called backing film by thermal lamination and/or hot embossing and/or printing. The IML shaped part can be preshaped in a deep drawing process and then be cut out or stamped out. The IML shaped part according to the invention can either be a flat insert part (in-mold labelling) or an insert part which is three-dimensionally shaped or preformed relative to a reference plane (insert molding).

SUMMARY OF THE INVENTION

The object of the present invention is to provide an improved method and an apparatus suitable for carrying out the method.

According to that object, there is proposed a method of manufacturing a shaped part decorated by in-mold decoration (IMD) and in-mold labelling (IML) with an injection molding apparatus having a decoration-side tool half and a core-side tool half, wherein the decoration-side tool half is movable and the core-side tool half is fixed with respect to a frame structure, including the following method steps:

a) introducing an IMD film into a mold recess in the decoration-side tool half, that is provided by a decoration-side mold surface, and fixing the IMD film;

b) inserting an IML shaped part into a mold recess in the core-side mold half, that is provided by a core-side mold surface, and fixing the IML shaped part, wherein the IML shaped part has an insert part decorative layer and a backing film;

c) closing the injection molding apparatus by lowering the decoration-side tool half on to the core-side tool half;

d) injecting a fluid thermoplastic injection molding material into the mold recess in the core-side tool half, wherein the fluid injection molding material presses the IML shaped part against the IMD film in the mold recess in the decoration-side tool half;

e) opening the injection molding apparatus after expiry of a cooling time for the shaped part; and f) removing the decorated shaped part.

The object of the invention is further attained by an injection molding apparatus for the manufacture of a shaped part decorated by in-mold decoration (IMD) and in-mold labelling (IML) having a decoration-side tool half and a core-side tool half, wherein the decoration-side tool half is movable and the core-side tool half is fixed with respect to a frame structure and has at least one injection passage, and wherein it is provided that a mold recess in the core-side tool half has a fixing device (different in particular from the at least one injection passage) for an IML shaped part, and the outlet opening of the at least one injection passage is arranged beneath the IML shaped part inserted into the core-side tool half.

The proposed method and the proposed apparatus combine the advantages of decoration by means of in-mold decoration film with the advantages of decoration by means of in-mold labelling shaped parts and at the same time opens up new design options.

Preferably the IMD film introduced in step a) and the IML shaped part inserted in step b) are so matched to each other that after method step d) the IMD film adheres so little to the surface of the IML shaped part that the IMD film can be removed from the shaped part without constituent parts of the IMD film adhering or sticking to the surface of the IML shaped part.

It can be provided that the IMD film is positioned in method step a) over the full surface area over the mold recess in the decoration-side tool half. The IMD film which is preferably in the form of a web or strip can be guided through the injection molding apparatus for example with a film advance device. The film advance device can include a supply roll for the IMD film, a take-up roll for the residual film, a transport device for stepwise transport of the IMD film and a fixing device for fixing the supplied IMD film to the decoration-side tool half. The IMD film can have, preferably at its outer edge, register marks which are detected by a preferably optical position sensor on the injection molding apparatus. In that way the position sensor can control the film advance device in such a way that it is possible to provide for positioning of the IMD film in an accurate position, that is to say in accurate register relationship, relative to the injection molding apparatus. In that respect the positional accuracy has a tolerance of between about 0 mm and 1 mm, preferably between 0.25 mm and 0.75 mm, in the advance direction. In that way it is possible for an IMD film with a single-image decoration which is to be applied to a shaped part in accurate positional relationship to be positioned in the injection molding apparatus in correspondingly accurate positional relationship by means of the register marks. The IMD film however can also have an endless decoration such as for example a continuous pattern and/or a wood graining and/or a single-color coloration, in which case positionally accurate positioning of the IMD film is not required for such an endless decoration.

The IML shaped part can be cut at the edge prior to method step b) and/or can be thermally shaped prior to or after the cutting operation.

It can be provided that the IML insert part is fixed in method step b) by position pins arranged in the mold recess in the core-side tool half. The position pins can be such that they engage into recesses at the rear side of the IML shaped part, in particular in the backing film, and thus fix the IML shaped part to prevent lateral displacement. When the fluid thermoplastic injection molding material is injected, in particular beneath the IML shaped part, the IML shaped part is lifted off the position pins and pressed by the pressure force of the injection molding material against the IMD film in the mold recess in the decoration-side tool half. As that displacement of the IML shaped part occurs very quickly due to the inflowing injection molding material without guidance by the position pins practice has shown that in that case troublesome lateral movements of the IML shaped part do not play any part worth mentioning.

It can also be provided that the IML shaped part is fixed in method step b) by electrostatic force and/or by vacuum force in the mold recess in the core-side tool half.

It can further be provided that the injection molding material is an acrylonitrile-butadiene-styrene copolymer (ABS=acrylonitrile-butadiene-styrene) or a mixture of an acrylonitrile-butadiene-styrene copolymer and a polycarbonate (PC) or a mixture of a polycarbonate and an acrylonitrile-butadiene-styrene copolymer and the backing film is an acrylonitrile-butadiene-styrene copolymer.

In another embodiment it can be provided that the injection molding material is a polycarbonate and the backing film is a polycarbonate.

It can further be provided that the injection molding material is polypropylene (PP) and the backing film is polypropylene.

It is also possible that the injection molding material is polymethylmethacrylate (PMMA) and the backing film is polymethylmethacrylate (PMMA).

Besides the above-described material pairings of the injection molding material and the backing film other combinations are also possible insofar as the backing film is liquefied in the injection molding process at least in the surface region and as a result can involve a join to the fluid injection molding material, which involves intimate joining of the materials concerned, which is resistant after cooling.

It can further be provided that the insert part decoration layer of the IML shaped part is radiation-hardened, in particular UV light-hardened. The hardening provides that the insert part decoration layer does not involve any join to the decorative layer of the IMD film, in particular no join to an adhesive layer of the decorative layer of the IMD film. By way of example such an insert part decorative layer can comprise an isocyanate-crosslinking acrylate protective lacquer.

In addition the IML shaped part can have a protective lacquer coating as the outer layer of the insert part decorative layer, which is such that in method step d) it does not adhere to the decorative layer of the IMD film, in particular not to the adhesive layer portion of the decorative layer of the IMD film. For example such a protective layer coating can comprise polyurethane (PU), polyvinylidene fluoride (PVDF), polyamide or polyester or can have same as a constituent.

Particularly in combination with the above-described positionally accurate positioning of the IMD film in the injection molding apparatus, it can be provided that the IMD film has an adhesive layer which is provided only region-wise and which is cut out in particular in the surface regions in which the IMD film overlaps with the IML shaped part. In that way the possibility of an unwanted adhesive join between the IMD film, in particular the adhesive layer thereof, and the surface of the IML shaped part, can be reduced.

Particularly in combination with the above-described positionally accurate positioning of the IMD film in the injection molding apparatus it can be provided that the IMD film has an adhesive layer which is provided over the full surface area involved and which is deactivated in particular in the surface regions in which the IMD film overlaps with the IML shaped part. A partial coating for example can be provided for deactivation purposes, wherein that coating is such that during the injection molding operation it does not adhere or adheres only slightly to the surface of the IML shaped part. The coating can be for example a radiation-hardening lacquer, a lacquer with a high pigment proportion or a powder coating. The coating can be applied fluid or also in solid form by means of hot embossing. The coating can be applied for example by means of an ink jet printer which is arranged in the region of the film feed to the injection molding apparatus and which in conjunction with the above-described positionally accurate positioning of the IMD film relative to the injection molding apparatus applies the coating to the IMD film in correspondingly accurately positional relationship. The coating can also be a self-adhesive label or sticker. That can further reduce the possibility of an unwanted adhesive join between the IMD film, in particular the adhesive layer thereof, and the surface of the IML shaped part.

Besides the above-described possibilities of preventing or greatly reducing adhesion of the IMD film, in particular the adhesive layer thereof, to the surface of the IML shaped part, in particular during the injection molding operation, other combinations of IMD film and IML shaped part are also possible if the adhesion (adhesion=attraction force between two substances due to molecular interactions) of the mutually facing layers of the IMD film and the IMD shaped part and cohesion (cohesion=internal binding forces between atoms or molecules within a substance) within the mutually facing layers of the IMD film and the IML shaped part are so matched to each other that the IMD film adheres so little to the surface of the IML shaped part that the IMD film can be removed from the IML shaped part after the injection molding operation without constituent parts of the IMD film adhering or clinging to the surface of the IML shaped part. At the same time the mutually facing layers of the IMD film and the IML shaped part must be per se sufficiently stable and resistant to be able to perform their purpose-related functions, in particular as the adhesive layer or the protective layer.

The existing thickness of material or wall thickness of the IML shaped part can advantageously provide a heat-insulating spacing between the hot injection molding material which flows into the injection molding apparatus during the injection molding process and the heat-activatable adhesive layer of the IMD film. That makes it possible to prevent the heat-activatable adhesive layer of the IMD film becoming sufficiently sticky, that is to say activated, to possibly produce a bond (adhesion) to the surface of the IML shaped part in the region in which the adhesive layer of the IMD film bears against the surface of the IML shaped part during the injection molding operation. Particularly during the short time of the injection molding operation, in which the injection molding apparatus is closed and the injection molding pressure is applied in the interior of the injection molding apparatus and thus acts on the adhesive layer of the IMD film, which lasts in particular only a few seconds (between about 1 and 20 s also in dependence on the geometry and size of the parts), the heat of the injection molding material cannot overcome the heat-insulating spacing of the IML shaped part sufficiently rapidly and in an adequate amount and as a result cannot adequately act on the adhesive layer of the IMD film and activate it. In method step d) the IML shaped part is pressed during the injection molding operation against the decoration-side tool half with the IMD film positioned therein. In that case the IML shaped part can be moved by between about 2 and 2.5 mm. That 'travel' is computed from the shaped part wall thickness that is definitively wanted, minus the wall thickness of the IML shaped part. Injection of the injection molding material is preferably effected beneath the IML shaped part in the direction of the decoration-side tool half having the IMD film so that the IML shaped part is moved in practice only in that direction and lateral displacement forces on the IML shaped part are avoided and perpendicular pressure against the decoration-side tool half is ensured.

Further configurations of the invention are directed to cleaning of the decorated shaped part removed from the injection molding apparatus. It is inevitable that decorative layer residues of the IMD film, so-called film flakes, remain on the decorated shaped part, and have to be removed therefrom. Those film flakes are fragments of the decorative layer of the IMD film, which were detached from the carrier film and are not to be confused with a plastic material burr which can be formed at the seam location between the two tool halves.

It can be provided that as a further method step there is provided:

g) cleaning of the decorated shaped part.

In method step g) there can be provided contacting and/or contact-less cleaning, for example brush cleaning in conjunction with ionisation. The ionisation can provide that the film flakes are discharged so that they no longer adhere to the surface of the decorated shaped part, which was electrostatically charged by brush friction, which makes brush cleaning difficult.

In method step g) it is also possible to provide a combination of cleaning with rotary brushes, by ionisation and suction removal.

In addition in method step g) it is possible to provide a combination comprising cleaning by ionisation, blowing against the part with turbulent compressed air and optional suctional removal.

In the injection molding apparatus the fixing device can be provided by position pins or also by a device for providing an electrostatic force and/or a vacuum for the provision of a vacuum force. That makes it possible to ensure that the IML shaped part is particularly well held in a defined position in the injection molding apparatus, and that hold is overcome only by the introduction of the injection molding material.

The injection molding apparatus can have more than one injection passage. That configuration can be preferred for example in the case of an IML shaped part which is of large area in comparison with the dimensioning of the decorated shaped part, in order that the IML shaped part is pressed uniformly against the IMD film at the decoration-side tool half.

It can further be provided that the decoration-side mold surface has a mold element for producing a design groove surrounding the IML shaped part. The design groove can visually conceal positional and/or molding inaccuracies in respect of the IML shaped part relative to the decorative layer on the IMD film. According to the tolerance in positional accuracy of the IMD film relative to the injection molding apparatus and the IML shaped part of between about 0 mm and 1 mm, preferably between 0.25 mm and 0.75 mm, and according to the tolerance in positional accuracy of the IML shaped part in the injection molding apparatus of between about 0 mm and 1 mm, preferably between 0.25 mm and 0.75 mm, it is advantageous if the design groove is between 0 mm and 2 mm, preferably between 0.5 mm and 1.5 mm, in width.

BRIEF DESCRIPTION OF THE DRAWINGS

The invention will now be described in greater detail by means of embodiments by way of example. In the drawing:

FIG. 5a shows a diagrammatic view in section along section line Va-Va in FIG. 5b of the injection molding of FIG. 4;

FIG. 5b shows a diagrammatic plan view of the injection molding of FIG. 4;

FIG. 6 shows a perspective view of a second embodiment of a decorated injection molding; and FIG. 7 shows a diagrammatic partial sectional view of the injection molding of FIG. 6.

DETAILED DESCRIPTION OF THE PREFERRED EMBODIMENTS

Figure 1:
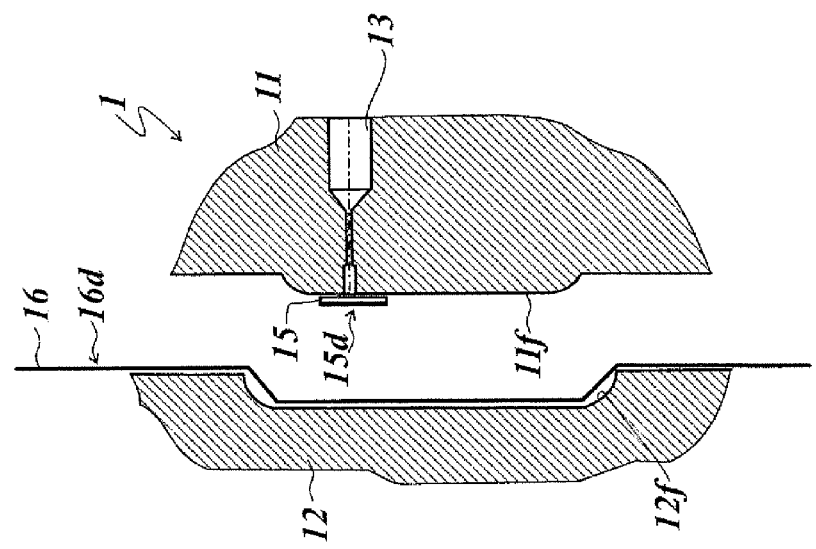
FIG. 1 shows a diagrammatic sectional view of an embodiment of an injection molding apparatus for the manufacture of a shaped part decorated by means of in-mold decoration (IMD) and in-mold labelling (IML)

FIG. 1 is a diagrammatic sectional view of an injection molding apparatus 1 having a core-side tool half 11 and a decoration-side tool half 12. The decoration-side tool half 12 is movable relative to the core-side tool half 11 which is fixed with respect to a frame structure. Both tool halves have mold surfaces 11*f* and 12*f* respectively, forming an injection molding mold.

In the embodiment shown in FIGS. 1 through 4 the core-side mold half 11*f* has region-wise a positive curvature, that is to say it is of a convex configuration. The decoration-side mold surface 12*f* has region-wise a negative curvature, that is to say a concave configuration. When the injection molding mold is closed formed between the two mold surfaces 11*f* and 12*f* is a receiving space for a liquefied thermoplastic injection molding material 17 which can be introduced by way of an injection passage 13, the mold surfaces 11*f* and 12*f* defining the outside contour of a decorated shaped part which can be produced in that way (see FIGS. 4, 5a and 5b).

Inserted into the decoration-side tool half 12 is an in-mold decoration film 16 (IMD=in-mold decoration), referred to hereinafter as the IMD film 16. Inserted into the core-side tool half 11 is a shaped part 15 decorated by means of in-mold labelling (IML=in-mold labelling), referred to hereinafter as the IML shaped part 15.

The IMD film 16 has a decorative layer 16*d* which is in the form of one or more layer portions and which is applied releasably to a carrier film. The decorative layer 16*d* preferably has an in particular multi-layer protective lacquer layer portion, an in particular multi-layer decorative layer portion which can have for example further full-area and/or partial lacquer layer portions or metal layer portions, and an in particular multi-layer adhesive layer portion. Further bonding intermediate layer portions in particular can be provided between those layer portions. The IMD film 16 is passed through the injection molding apparatus with a film advance device (not shown in FIG. 1). The film advance device can have a supply roll for the IMD film, a take-up roll for the residual film, that is to say for the carrier film and residues of the decorative layer, that remain on the carrier film, a transport device for stepwise transport of the IMD film and a fixing device for fixing the fed IMD film at the decoration-side tool half 12. During the injection molding operation the decorative layer 16 is released from the carrier film and transferred to the surface of the shaped part 14 by the action of temperature and/or pressure. In accordance with the principle of the hot embossing films, the IMD film 16 is a further development thereof and is suitable for three-dimensional processing in special IMD injection molding tools. The IMD method is a decoration process which is integrated into the injection molding process. In that respect the classic embossing parameters of pressure, temperature and time are produced by the injection molding process. A prerequisite for the decoration method described hereinafter is an article geometry which can be decorated with an IMD film over its full surface area.

The IML shaped part 15 is a decorated insert part in which an insert part decorative layer 15*d* is applied to a so-called backing film 15*b* by thermal lamination, hot embossing, cold embossing or printing. In the case of a hot-embossed insert part decorative layer 15d a hot embossing film having a carrier film and a decorative layer arranged releasably thereon and consisting of release layer portions, protective layer portions, decorative layer portions and adhesive layer portions, was applied by means of pressure and heat to the surface of the IML shaped portion, wherein the carrier film is then pulled off the decorative layer and the protective layer portion forms the uppermost layer portion of the decorative layer. In the case of a cold-embossed insert part decorative layer 15d firstly an adhesive layer portion is applied to the IML part, for example by printing, and then a transfer film comprising a carrier film and a decorative layer arranged releasably thereon, consisting of release layer portions, protective layer portions and decorative layer portions is rolled on to the adhesive layer. Prior to and/or during and/or after the rolling operation the adhesive layer is hardened and thus activated by means of energy-rich radiation, in particular UV radiation, and then the carrier film is pulled off the insert part decorative layer 15d which adheres fixedly on the IMD shaped part. The IML shaped part 15 is an additional decorative element which in the finished shaped part 14 is surrounded over the full surface area by the decorative layer 16d.

The IML shaped part 15 is preshaped in a deep drawing process and stamped out. The preceding thermal shaping operation is not absolutely necessary. The edge cutting operation can be effected for example by stamping, milling, laser cutting or water jet cutting. The technically demanding method is suitable in particular for endless decorations on strongly accentuated 3D shapes. Besides standard decorations, special degrees of sheen, a greater depth effect and higher levels of abrasion resistance are possible with an additional refining step.

The IML shaped part 15 can also comprise a composite material, in which case that composite material is provided on its rear with a thermoplastic material layer functionally corresponding to the backing film 15b to produce a connection between the injection molding material 17 and the material layer, involving intimate joining of those materials, during the injection molding operation. On the front-side surface the composite material can be provided with a protective layer portion functionally corresponding to the insert part decorative layer 15d. The composite material can have for example a metal layer portion, for example of aluminum, steel, copper, titanium, brass or alloys thereof; a natural or synthetic fiber layer portion, for example cotton, jute, linen, sisal, hemp, glass fiber, carbon fiber, polyester, polyamide; a natural material layer portion, for example wood, leather or a laminate or composite material, for example organic sheet, fiber reinforced plastic, GRP (GRP=glass fiber reinforced plastic), CRP (CRP=carbon fiber reinforced plastic) or combinations thereof, which as described above, is provided on front and rear side with further layer portions.

Figure 2:
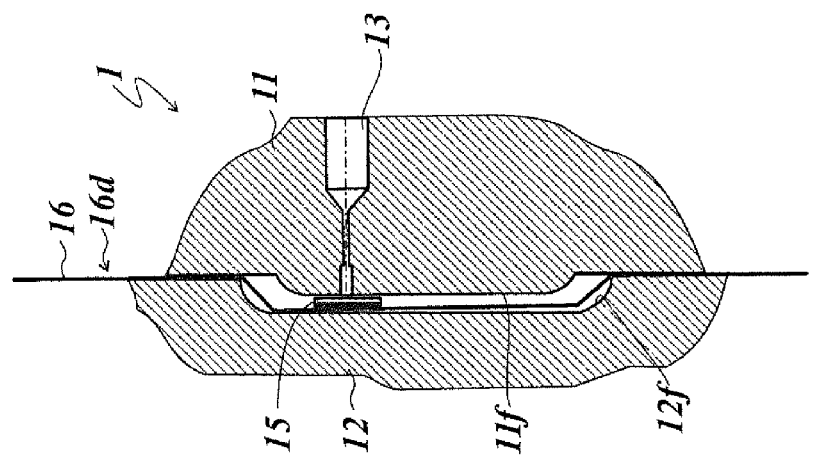
FIG. 2 shows the injection molding apparatus of FIG. 1 in the closed condition.

The IML shaped part 15 can be fixed on the core-side mold surface 11f by position pins and/or electrostatic force and/or vacuum force. The outlet opening of the injection passage 13 is arranged under the IML shaped part 15 so that upon injection of the thermoplastic material the IML shaped part 15 is pressed against the decorative layer 16d of the IMD film 16 and the material is injected therebehind. As shown in FIG. 2 when the injection mold is closed the IML shaped part 15 is already disposed approximately at the IMD film 16 which is still arranged loosely in the decoration-side tool half 12 and which in this method step is not yet pressed against the decoration-side mold surface 12f.

Figure 3:
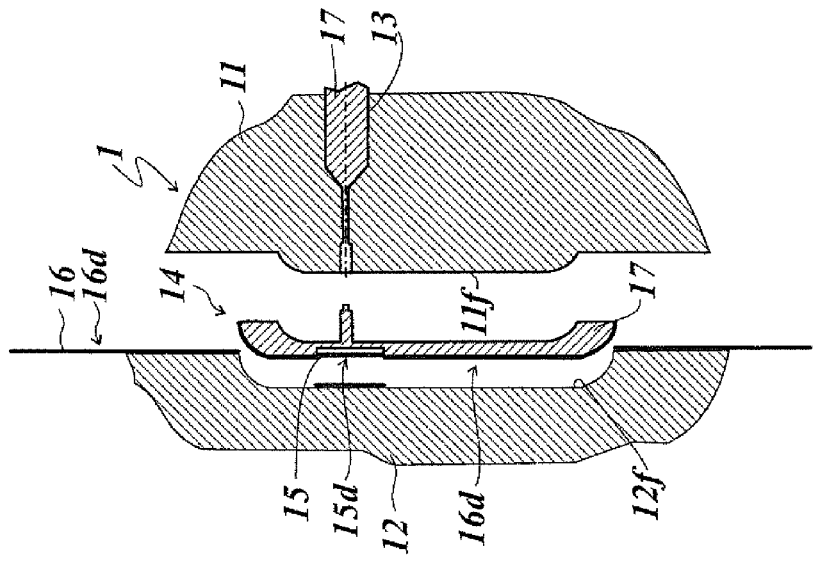
FIG. 3 shows the injection molding apparatus of FIG. 1 in the closed condition and with injected plastic material.

FIG. 3 shows the injection molding apparatus 1 with injected injection molding material 17. The IML shaped part 15 is now pressed against the decorative layer of the IMD film 16 and is connected to the injected injection molding material 17 by a join involving intimate connection of the materials concerned. The injection molding material 17 can be a thermoplastic material or a thermoplastic material mixture, for example acrylonitrile-butadiene-styrene copolymer (ABS), polycarbonate (PC), polypropylene (PP), polymethylmethacrylate (PMMA) or a mixture of polycarbonate and acrylonitrile-butadiene-styrene copolymer (PC/ABS).

The aforementioned plastic materials can also be used as the material for the backing film 15b of the IML shaped part 15. In that respect not all combinations of materials are suitable. This must involve material combinations which involve a connection to each other involving intimate joining of the materials concerned and which can preferably be produced in the form of deep-drawable plastic films.

Table 1 summarises suitable combinations of the injection molding material 17 and the backing film 15b of the IML shaped part 15:

TABLE 1

| Injection molding material | Backing film |
| --- | --- |
| Acrylonitrile-butadiene-styrene copolymer (ABS) | ABS |
| ABS/polycarbonate (PC) | ABS |
| PC/ABS | ABS |
| PC | PC |
| Polypropylene (PP) | PP |
| Polymethylmethacrylate (PPMA) | PMMA |

A further prerequisite is non-adhesion of the insert part decorative layer 15d of the IML shaped part 15 to the decorative layer 16d of the IMD film 16, in particular the adhesive layer of the IMD film 16, that faces towards the insert part decorative layer 15d. In regard to the insert part decorative layer 15d of the IML shaped part 15, UV hardening of the deep-drawn and cut IML shaped part 15 has proven worthwhile. The higher degree of crosslinking of the lacquer system of the insert part decorative layer 15d leads to a markedly harder surface as well as reduced surface tension so that the insert part decorative layer 15d, at the necessary tool and injection molding material temperatures, does not entail any join to the adhesive layer of the IMD film 16, that faces towards the insert part decorative layer 15d.

Table 2 shows the maximum temperatures ascertained in testing for the injection molding tool and the injection molding material.

TABLE 2

| Component | Temperature range |
| --- | --- |
| Injection molding tool 11 and 12 | 40-80° C. |
| Injection molding material 17 | 200-280° C. |

Figure 4:
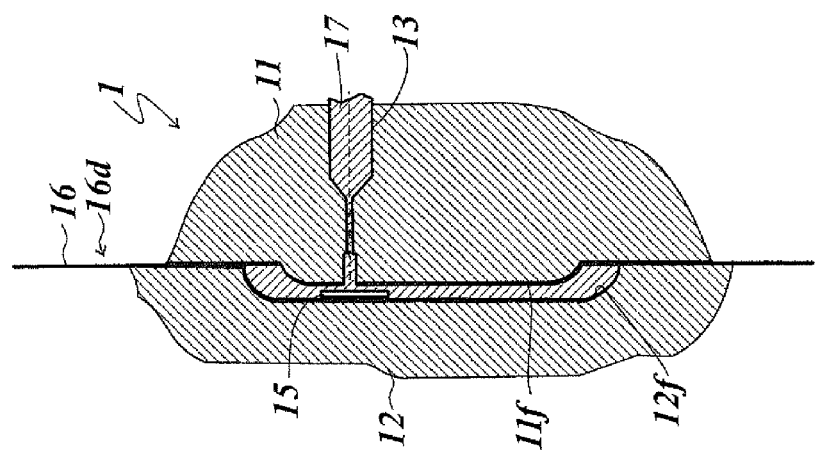
FIG. 4 shows the injection molding apparatus of FIG. 1 in the opened condition with a decorated injection molding.

FIG. 4 shows the opened injection molding apparatus 1 with the hardened decorated shaped part 14 which can be removed from the injection molding apparatus 1.

The decorative layer 16d of the IMD film 16 is transferred to the decorative side of the shaped part 14 over the full surface area, with the exception of the region in which the IML shaped part 15 is arranged. The carrier film (not shown in FIG. 4) of the IMD film 16 and the non-transferred region of the decorative layer 16d remain on the decoration-side mold surface 12f, and they can now be removed.

Decorative layer residues, so-called film flakes, can have remained on the shaped part 14, and they now have to be removed from the shaped part 14. Those film flakes are not to be confused with a plastic material burr and are to be viewed as being inherent in the system. Extensive tests with different IMD films 16 and IML shaped parts 15 showed that the film flakes can be very well removed with a combination of rotary brushes, ionisation and suction removal. The combination of ionisation, turbulent compressed air and optional suction removal also exhibited very good results for shaped parts 14 with a pronounced 3D structure.

For the sake of better understanding FIGS. 5a and 5b show two views of the finished shaped part 14 from FIG. 4. Unlike the view in FIG. 4 the injection support which has remained at the rear side of the shaped part 14 has been removed.

FIGS. 6 and 7 show a second embodiment in which there is a design groove 14n extending around the IML shaped part 15, for design delimitation purposes. The shaped part 14 is of a donut shape, wherein the IML shaped part 15 is of an annular configuration and corresponds in its geometry to the geometry of the shaped part.

The design groove 14n visually conceals possible positional tolerances of the IML shaped part 15. In this embodiment the injection molding material 17 can be ABS or ABS/PC. With the donut-shaped shaped part 14 illustrated in FIGS. 6 and 7 the method according to the invention is performed with the following parameters: injection time about 1 s, post-pressure time about 9 s, cooling time about 20 s (method step d)). The time for which pressure and heat acts in particular on the adhesive layer of the IMD film 16 and activates same and causes it to become sticky is in that case about 10 s (injection time+post-pressure time). During the injection time hot injection molding material flows into the injection molding apparatus 1 and due to the injection pressure and the temperature of the injection molding material produces suitable conditions within the injection molding apparatus 1. During the post-pressure time the injection molding apparatus 1 remains closed, is heated and is left under pressure, that is to say pressure and temperature remain substantially constant during that post-pressure time. During the cooling time the injection molding apparatus 1 remains closed but in a pressure-less condition and with a continuously decreasing temperature level until the injection molding apparatus 1 can be opened and the shaped part 14 removed.

LIST OF REFERENCE NUMERALS 1 injection molding apparatus
11 core-side tool half
11f core-side mold surface
12 decoration-side tool half
12f decoration-side mold surface
13 injection passage
14 shaped part
14n design groove
15 IML shaped part
15b backing film
15d insert part decorative layer
16 IMD film
16d decorative layer
17 injection molding material

The invention claimed is:

1. A method of manufacturing a shaped part decorated by in-mold decoration (IMD) and in-mold labelling (IML) with an injection molding apparatus having a decoration-side tool half and a core-side tool half, wherein the decoration-side tool half is movable and the core-side tool half is fixed with respect to a frame structure, the method comprising the steps of:
   a) introducing an IMD film into a mold recess in the decoration-side tool half, that is provided by a decoration-side mold surface, and fixing the IMD film;
   b) inserting an IML shaped part into a mold recess in the core-side mold half, that is provided by a core-side mold surface, and fixing the IML shaped part, wherein the IML shaped part has an insert part decorative layer and a backing film;
   c) closing the injection molding apparatus by lowering the decoration-side tool half on to the core-side tool half;
   d) injecting a fluid thermoplastic injection molding material into the mold recess in the core-side tool half, wherein the fluid injection molding material releases the IML shaped part from the core-side tool half and presses it against the IMD film in the mold recess in the decoration-side tool half;
   e) opening the injection molding apparatus after expiry of a cooling time for the shaped part; and
   f) removing the decorated shaped part,
   wherein the insert part decoration layer of the IML shaped part is UV light-hardened.

2. A method as set forth in claim 1, wherein the IMD film is positioned in method step a) over the full surface area over the mold recess in the decoration-side tool half.

3. A method as set forth in claim 1, wherein the IML insert part is fixed in method step b) by position pins arranged in the mold recess in the core-side tool half.

4. A method as set forth in claim 1, A method as set forth in claim 1, wherein the IML insert part is fixed in method step b) by electrostatic force and/or by vacuum force in the mold recess in the core-side tool half.

5. A method as set forth in claim 1, wherein the injection molding material is an acrylonitrile-butadiene-styrene copolymer or a mixture of an acrylonitrile-butadiene-styrene copolymer and a polycarbonate or a mixture of a polycarbonate and an acrylonitrile-butadiene-styrene copolymer and the backing film is an acrylonitrile-butadiene-styrene copolymer.

6. A method as set forth in claim 1, wherein the injection molding material is a polycarbonate and the backing film is a polycarbonate.

7. A method as set forth in claim 1, wherein the injection molding material is polypropylene and the backing film is polypropylene.

8. A method as set forth in claim 1, wherein the injection molding material is polymethylmethacrylate and the backing film is polymethylmethacrylate.

9. A method as set forth in claim 1, further comprising the step of:
   g) cleaning the decorated shaped part.

10. A method as set forth in claim 9, wherein contacting and/or contact-less cleaning is provided in method step g).

11. A method as set forth in claim 9, wherein a combination of a cleaning operation by ionisation, blowing against the shaped part with turbulent compressed air and optional suction removal is provided in method step g).

12. A method of manufacturing a shaped part decorated by in-mold decoration (IMD) and in-mold labelling (IML) with an injection molding apparatus having a decoration-side tool half and a core-side tool half, wherein the decoration-side tool half is movable and the core-side tool half is fixed with respect to a frame structure, the method comprising the steps of:
   a) introducing an IMD film into a mold recess in the decoration-side tool half, that is provided by a decoration-side mold surface, and fixing the IMD film;
   b) inserting an IML shaped part into a mold recess in the core-side mold half, that is provided by a core-side mold surface, and fixing the IML shaped part, wherein the IML shaped part has an insert part decorative layer and a backing film;

c) closing the injection molding apparatus by lowering the decoration-side tool half on to the core-side tool half;

d) injecting a fluid thermoplastic injection molding material into the mold recess in the core-side tool half, wherein the fluid injection molding material releases the IML shaped part from the core-side tool half and presses it against the IMD film in the mold recess in the decoration-side tool half;

e) opening the injection molding apparatus after expiry of a cooling time for the shaped part; and f) removing the decorated shaped part, wherein the IML shaped part has a protective lacquer coating, which is so adapted that, in method step d), it does not adhere to the decorative layer of the IMD film.

13. A method as set forth in claim 12, wherein the IMD film is positioned in method step a) over the full surface area over the mold recess in the decoration-side tool half.

14. A method as set forth in claim 12, wherein the IML insert part is fixed in method step b) by position pins arranged in the mold recess in the core-side tool half.

15. A method as set forth in claim 12, wherein the IML insert part is fixed in method step b) by electrostatic force and/or by vacuum force in the mold recess in the core-side tool half.

16. A method of manufacturing a shaped part decorated by in-mold decoration (IMD) and in-mold labelling (IML) with an injection molding apparatus having a decoration-side tool half and a core-side tool half, wherein the decoration-side tool half is movable and the core-side tool half is fixed with respect to a frame structure, the method comprising the steps of:

a) introducing an IMD film into a mold recess in the decoration-side tool half, that is provided by a decoration-side mold surface, and fixing the IMD film;

b) inserting an IML shaped part into a mold recess in the core-side mold half, that is provided by a core-side mold surface, and fixing the IML shaped part, wherein the IML shaped part has an insert part decorative layer and a backing film;

c) closing the injection molding apparatus by lowering the decoration-side tool half on to the core-side tool half;

d) injecting a fluid thermoplastic injection molding material into the mold recess in the core-side tool half, wherein the fluid injection molding material releases the IML shaped part from the core-side tool half and presses it against the IMD film in the mold recess in the decoration-side tool half;

e) opening the injection molding apparatus after expiry of a cooling time for the shaped part; and f) removing the decorated shaped part, wherein the IMD film has an adhesive layer covering the full surface area involved and which is deactivated by partial coating in the surface regions in which the IMD film overlaps with the IML shaped part, and wherein the partial coating is so adapted that, during method step d), it does not adhere or it adheres only slightly to the surface of the IML shaped part.

17. A method as set forth in claim 16, wherein the IMD film is positioned in method step a) over the full surface area over the mold recess in the decoration-side tool half.

18. A method as set forth in claim 16, wherein the IML insert part is fixed in method step b) by position pins arranged in the mold recess in the core-side tool half.

19. A method as set forth in claim 16, wherein the IML insert part is fixed in method step b) by electrostatic force and/or by vacuum force in the mold recess in the core-side tool half.

* * * * *

UNITED STATES PATENT AND TRADEMARK OFFICE
CERTIFICATE OF CORRECTION

PATENT NO. : 9,090,009 B2  
APPLICATION NO. : 13/472694  
DATED : July 28, 2015  
INVENTOR(S) : Deckert et al.

Page 1 of 1

It is certified that error appears in the above-identified patent and that said Letters Patent is hereby corrected as shown below:

IN THE CLAIMS:

Column 10, line 29:

(Claim 4)     Now reads: "A method as set forth in claim 1, A method as set forth in claim 1, wherein"

Should read: -- A method as set forth in claim 1, wherein --

Signed and Sealed this  
Twenty-first Day of June, 2016

Michelle K. Lee  
*Director of the United States Patent and Trademark Office*